United States Patent [19]
Swars

[11] Patent Number: 5,064,726
[45] Date of Patent: Nov. 12, 1991

[54] HOLLOW COMPOSITE MEMBER

[75] Inventor: Helmut Swars, Bergisch Gladbach, Fed. Rep. of Germany

[73] Assignee: Emitec Gesellschaft für Emissionstechnologie m.b.H., Lohmar, Fed. Rep. of Germany

[21] Appl. No.: 431,645

[22] Filed: Nov. 3, 1989

[30] Foreign Application Priority Data

Nov. 3, 1988 [DE] Fed. Rep. of Germany ....... 3837293

[51] Int. Cl.[5] ............... F16C 3/00; F16C 3/06; F16H 53/00
[52] U.S. Cl. .................... 428/586; 74/567; 74/579 R; 74/595; 464/183
[58] Field of Search ............ 428/586; 74/567, 579 R, 74/595; 464/183; 29/523

[56] References Cited

U.S. PATENT DOCUMENTS

| 1,441,459 | 1/1923 | Small | 428/586 |
|---|---|---|---|
| 1,587,025 | 6/1926 | Murray et al. | 464/183 |
| 2,063,325 | 12/1936 | Mcleod | 428/610 |
| 3,466,895 | 9/1969 | Cartwright | 464/183 |
| 3,762,032 | 10/1973 | Bowling et al. | 29/523 |
| 3,844,730 | 10/1974 | Laussermain | 29/523 |
| 4,332,073 | 6/1982 | Yoshida | 29/523 |
| 4,359,811 | 11/1982 | Monroe | 29/523 |
| 4,377,894 | 3/1983 | Yoshida | 29/523 |
| 4,658,319 | 8/1987 | Gross et al. | 29/523 |
| 4,708,029 | 11/1987 | Urano | 74/567 |

FOREIGN PATENT DOCUMENTS

| 0068434 | 1/1983 | European Pat. Off. . | |
| 212130 | 6/1986 | European Pat. Off. | 29/523 |
| 0212130 | 3/1987 | European Pat. Off. . | |
| 324499 | 7/1989 | European Pat. Off. | 74/567 |
| 324500 | 7/1989 | European Pat. Off. | 74/567 |
| 3128744 | 2/1983 | Fed. Rep. of Germany . | |
| 3243838 | 5/1984 | Fed. Rep. of Germany . | |
| 3542071 | 6/1986 | Fed. Rep. of Germany . | |
| 3610134 | 4/1988 | Fed. Rep. of Germany . | |
| 44-4075 | 2/1969 | Japan | 464/183 |
| 57-90415 | 6/1982 | Japan | 464/183 |
| 58-132325 | 6/1983 | Japan . | |
| 59-27354 | 2/1984 | Japan . | |
| 6188930 | 7/1986 | Japan . | |
| 6188931 | 7/1986 | Japan . | |
| 6188932 | 7/1986 | Japan . | |
| 62-5817 | 9/1978 | U.S.S.R. | 29/523 |
| 2050207 A | 1/1981 | United Kingdom | 29/523 |
| 2133499 | 7/1984 | United Kingdom . | |

Primary Examiner—John J. Zimmerman
Attorney, Agent, or Firm—Toren, McGeady & Associates

[57] ABSTRACT

A hollow composite member for accommodating torques and/or tensile, compressive or bending forces in the case of which a circumferentially uniform tensile prestress is generated in an outer material layer essentially along its entire axial length by inner supporting members accommodating pressure in the radial direction, and where, especially in the outer material layer a compressive prestress which is either uniform or increased towards the center is prevailing as a result of inner supporting members accommodating tension in the axial direction.

4 Claims, 6 Drawing Sheets

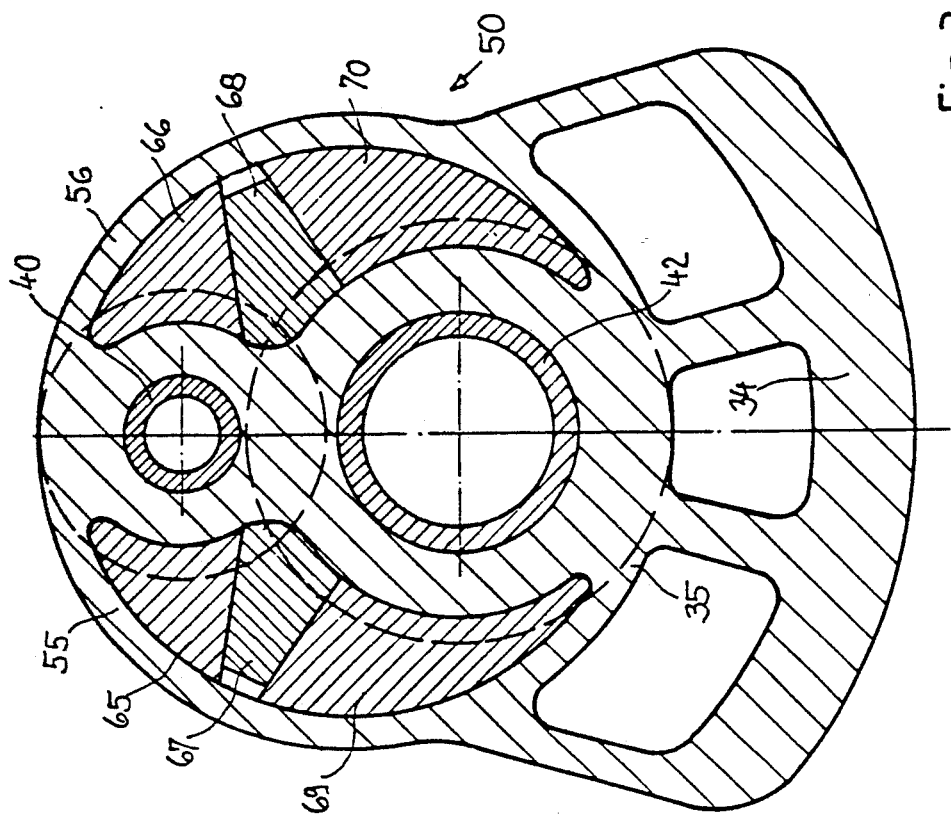
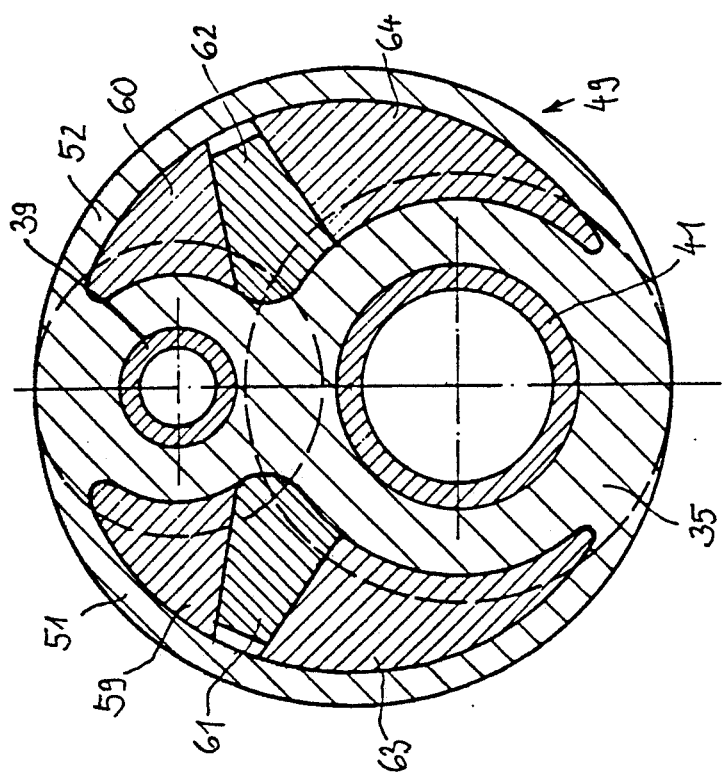

HOLLOW COMPOSITE MEMBER

BACKGROUND OF THE INVENTION

The invention relates to a hollow composite member for receiving torque and/or tensile, compressive or bending forces.

Hollow composite members are known from EP 0 212 130, for example, in which a reinforcing cylinder is attached to a tubular piece in such a way that there remains a compressive prestress in the tubular piece and a tensile prestress in the reinforcing cylinder. The reinforcing cylinder preferably consists of a fiber composite material, with the insertion of the two parts into each other being achieved by elastic deformation in the sense of expanding the reinforcing member and radially compressing the tubular member, with the force-locking connection taking place when a balance occurs.

SUMMARY OF THE INVENTION

It is the object of the present invention to provide various elements in the form of hollow composite members which, while being light weight, have high strength values and are easy to produce.

Pursuant to this object, and others which will become apparent hereafter, one aspect of the present invention resides in providing inner supporting means accommodating pressure in the radial direction to ensure that in an outer material layer, essentially along its entire axial length, there prevails a circumferentially uniform tensile prestress. In accordance with the wall thickness distribution and the magnitude of local pressure application and the sequence, in terms of time, of the application of pressure to individual axial regions, it is proposed that in the outer layer, if applicable, there should prevail simultaneously a uniform or non-uniform compressive prestress.

According to a first embodiment of the invention, the supporting means are formed by a plastically expanded inner layer continuously resting against the outer layer and consisting of a material with a lower yield point. This solution provides easily producible hollow members which, as a result of their internal prestress, exhibit an increased stiffness vis-a-vis bending and torsional loads, such as is advantageous in crankshafts, driveshafts or camshafts. By adjusting the yield points of the materials in accordance with the invention, it is possible to achieve the required stress condition in a way known in itself by internal pressure application.

According to a second embodiment, the supporting means are formed by several plastically deformed annular or sleeve members resting against part of a material with a lower yield point, especially in connection with intermediate formed members. The members produced in this way are suitable for applications where the cross-section of the hollow member is not round, with a preferred example being connecting rods. Several round sleeves are inserted into a member determining the outer contour and are plastically expanded by known means. The spaces existing between the outer layer and the inner sleeves have to be filled by several formed members which comprise sliding joints relative to each other extending at an angle relative to the direction of the spring-back force. The angle has a self-inhibiting effect, and the respective outermost opposite sleeves are suitable for being used directly as connecting rod eyes.

In the course of expansion, there is obtained a relatively low force for deforming the supporting means, and after completion of the expansion process, there is generated a very high supporting effect. In this case, too, a uniform tensile prestress is generated in the layer determining the outer contour, whereas the inner sleeves are under a compressive prestress. The prestressed material of the hollow member is light in weight and achieves a high stability of form.

According to a third embodiment which may relate to hollow composite members with a round and a non-round cross-section, clamping members supporting each other through self-inhibition are provided between the outer layer and one or several sleeves, with the plastically deformed material of the inner layer or the sleeves again having a lower yield point than the outer layer. As a result of plastic expansion, the clamping members which are outwardly slidingly movable relative to each other and support each other inwardly through self-inhibition, thereby preventing any sliding back, are changed in respect of their position in such a way that they participate in maintaining the prestress in the outer layer to a considerable extent due to their high compressive strength. The inner plastically deformed material layer securely fixes the clamping members in the expanded position.

Preferred materials for the outer layer are materials with a high tensile strength and a high yield point such as heat treated steels, spring steels, titanium or fiber composites. Materials suitable for the inner layer and the sleeve, which must be plastically deformable, are correspondingly selected structural steels, carbon steels or non-ferrous metals. The outer layer and the inner layer or inner sleeves may, in turn, consist of several layers having an outwardly increasing strength. The clamping members of the intermediate layer preferably consist of ceramics or a hard material with a high compressive stiffness, with brittle materials being suitable as well. The prestress remaining between the outer and the inner layer generates adhesion locking, even between the individual layers. Because of the adhesion locking effect it is possible to compose the outer layer and/or inner layer or inner sleeves of several axial individual portions, and if the inner and outer layers comprise joints, these should be sufficiently far axially offset. In this way it is possible to construct the hollow composite member of shorter sleeve pieces.

The wall thickness of the composite layers or the strength values of hollow members axially composed of individual portions may be stepped in the longitudinal direction so that with different expansion pressures applied successively or with identical expansion pressures applied simultaneously, there are obtained different axial and radial prestresses, with the latter being approximately uniform in the individual cross-sections.

Plastic expansion of the inner layer or inner sleeves should be effected through internal pressure application which may take place quasi-statically or in a pulsating or explosion-like way, preferably against the support provided by an outer mold or die where there has to be ensured an expansion play, and before the elasticity limit is reached, the outer layer should rest against the very stable wall so that the expansion pressure does not have to be strictly limited.

Additional supporting means in the form of transverse bases or the like may be pressed or formed into the inner layer or inner sleeves, thereby providing an increased radial stiffness in the region of cross-sectional steps for example.

The prestress maintained in the inner and outer layers may also be generated by other joining processes, especially thermal joining (shrinking, waxing) or exclusively by an axial pressure connection, in which case the relationship between the yield points of the materials of the inner and outer layer is less important.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1b is a longitudinal section through a hollow member according to FIG. 1a;

FIG. 3b is a cross-section of a first embodiment of a hollow member according to FIG. 3a;

FIG. 3c shows a second cross-section of a first embodiment of a hollow member according to FIG. 3a;

FIG. 3d shows a first cross-section of a second embodiment of a hollow member according to FIG. 3a; and FIG. 3e shows a second cross-section of a second embodiment of a hollow member according to FIG. 3a.

DESCRIPTION OF THE PREFERRED EMBODIMENTS

Figure 1A:
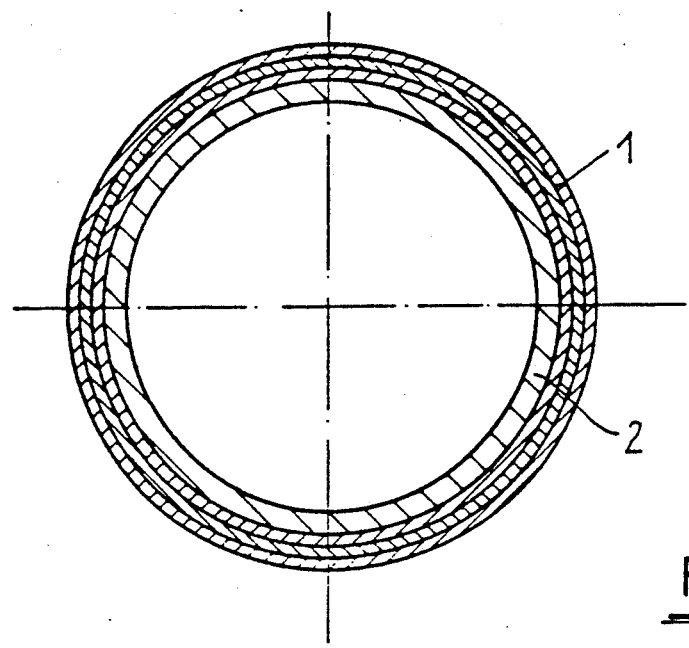
FIG. 1a is a cross-section of a first embodiment of a hollow composite member in accordance with the invention.

FIG. 1a shows a round hollow member having an outer sleeve 1 which consists of several layers, not described in detail, with an inner sleeve 2 directly resting against it.

Figure 1B:
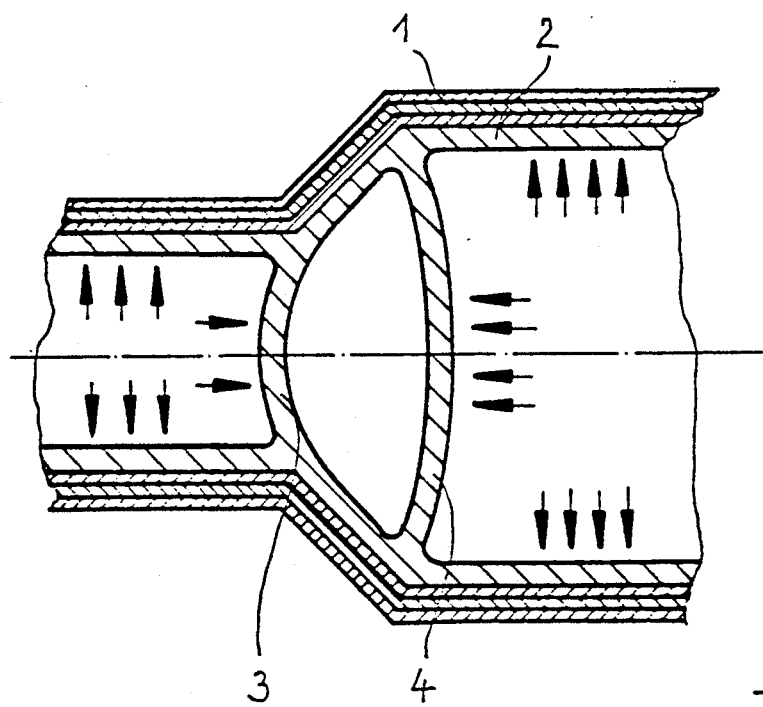

FIG. 1b shows the outer sleeve 1 consisting of several layers, the inner sleeve 2 inserted into it and two intermediate bases 3, 4 in the region of the cross-sectional steps, connected so as to be integral with the inner sleeve 2. The intermediate bases 3, 4 are curved in such a way that, in order to achieve an increased prestress in the outer sleeve 1, they are flattened under plastic deformation when the internal sleeve 2 is subjected to internal pressure as indicated by the arrows.

Figure 2A:
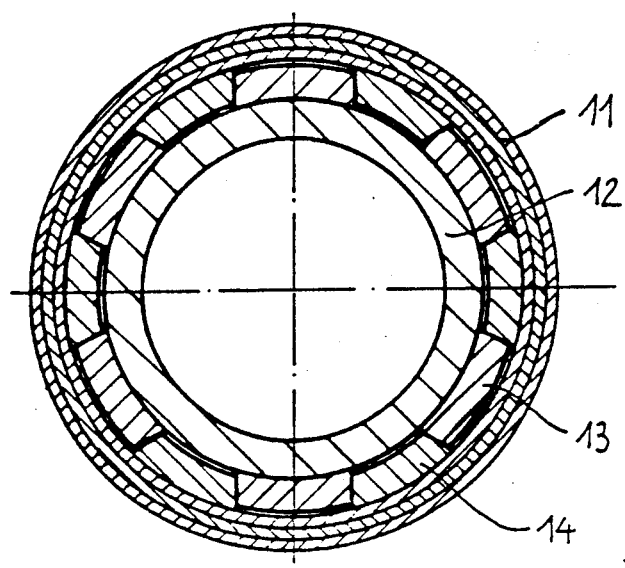
FIG. 2a is a cross-section of a second embodiment of a hollow composite member in accordance with the invention; prior to being expanded.
Figure 2B:
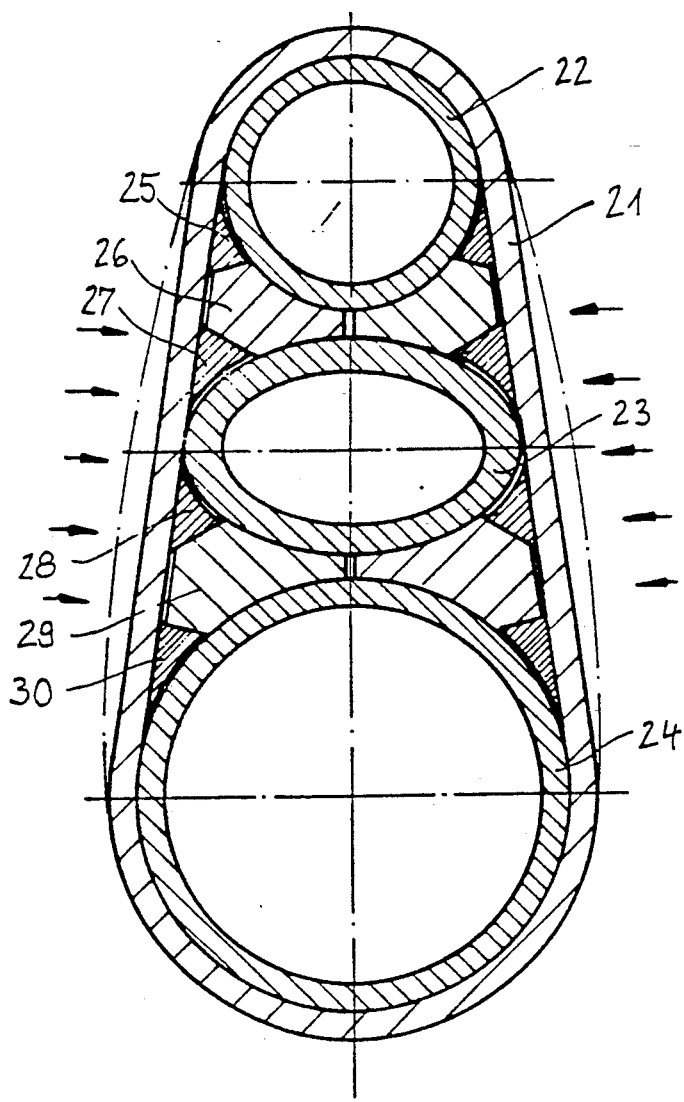
FIG. 2b is a cross-section through a third embodiment of a hollow composite member in accordance with the invention, prior to being expanded.
Figure 2C:
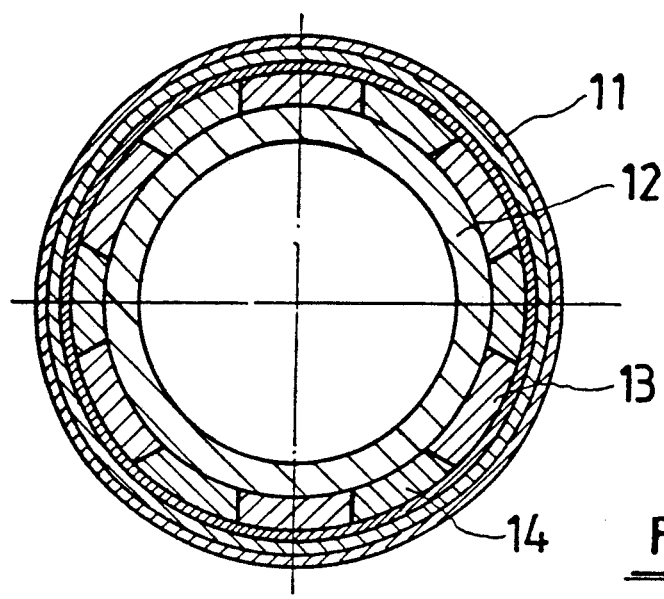
FIG. 2c shows a cross-section of a hollow member according to FIG. 2a after having been expanded.

FIGS. 2a and 2c show a round hollow member with an outer layer 11 in turn consisting of several individual layers which will not be described in more detail. An inner sleeve 12 is arranged at a distance therefrom, with supporting members 13, 14 provided with radially wedge-shaped faces being arranged between the two layers. These supporting members 13, 14 may move relative to each other in the course of plastic or thermal deformation of the sleeve 12, and during the spring-back of the purely elastically expanded sleeve member 11, they are wedged against each other, thereby participating in the compressive prestress. FIG. 2a shows the situation preceding the deformation of the inner sleeve 12, with the supporting members 13, 14 being offset relative to each other at the contact faces. FIG. 2c illustrates the situation following the deformation of the inner sleeve 12 and a radial displacement of the inner supporting members 13 between the outer supporting members 14 which, in this position, hold the elastically prestressed outer layer 11 on an increased supporting circumference in a position where they are distributed relative to each other. The inner sleeve 12 may be inserted in a chilled condition or it may be plastically expanded after having been inserted in a stress-free condition.

Figure 2D:
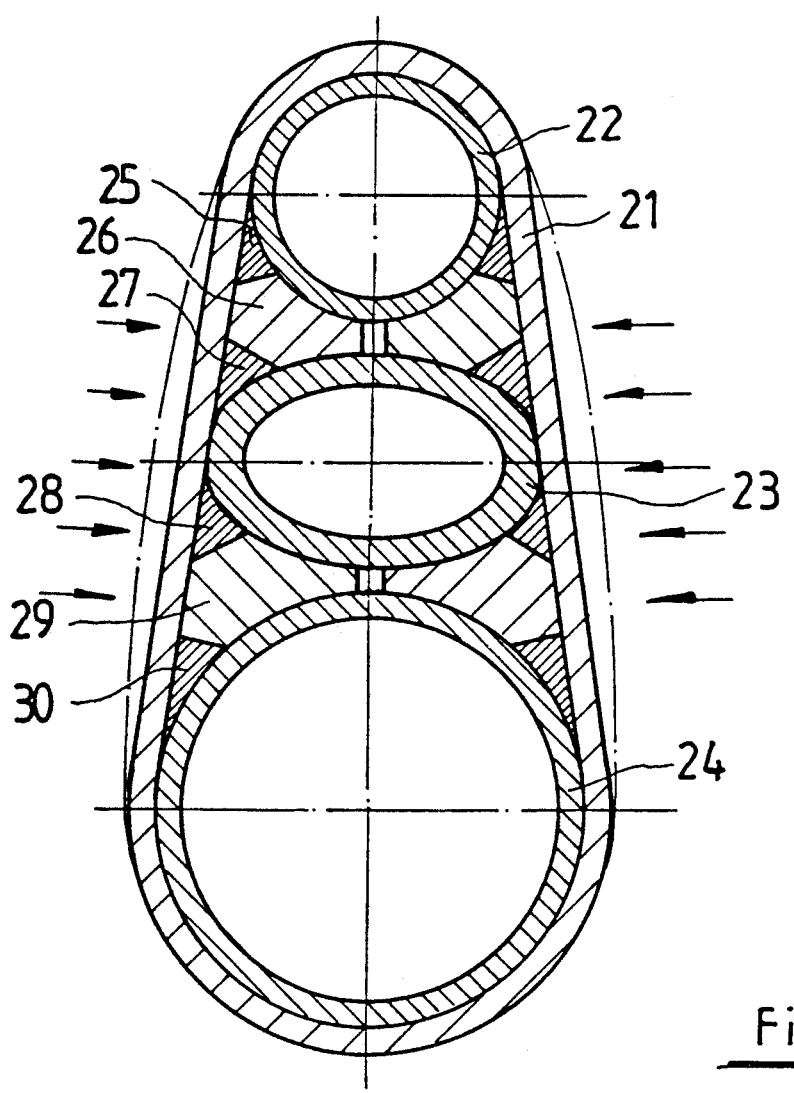
FIG. 2d shows a cross-section through a hollow member according to FIG. 2b after having been expanded.

FIGS. 2b and 2d show a hollow member having an outer layer 21 consisting of two circular arches and two tangential connections as well as several round or oval sleeves 22, 23, 24 which are inserted therein and which, for the purpose of generating an elastic prestress in the outer layer 21, were subjected to internal expansion and plastic deformation. Always between two of the sleeves, there are inserted supporting members 25, 26, 27; 28, 29, 30 of a high compressive stiffness, such as ceramic, which serve to transmit pressure from the not directly contacting regions of the sleeve member to the outer layer 21 and which, in the course of the plastic or thermal deformation of the sleeves 22, 23, 24, move relative to each other, whereas during the spring-back of the purely elastically expanded sleeve members 21, they are wedged against each other, thereby participating in the compressive prestress. FIG. 2b shows the situation preceding the deformation of the inner sleeves 22, 23, 24, with the supporting members, at their contact faces, being alternately offset inwardly and outwardly. FIG. 2d illustrates the situation following the deformation of the inner sleeves 22, 23, 24, with the initially inwardly offset supporting members 26, 29 being displaced radially outwardly between the remaining supporting members 25, 27, 28, 30 and with the supporting members together holding the elastically prestressed outer layer 21 on an increased circumference in a position where they are distributed relative to each other. The inner sleeves may be inserted in a chilled condition or, after having been inserted in a stress-free condition, they may be mechanically or hydraulically expanded up to the point of plastic deformation.

In each case, radial arrows indicate that by applying counter pressure expansion, as indicated by the chain-dotted thin lines, can be avoided and that the outer layer, even subsequently, retains the drawn shape it had at the beginning.

Figure 3A:
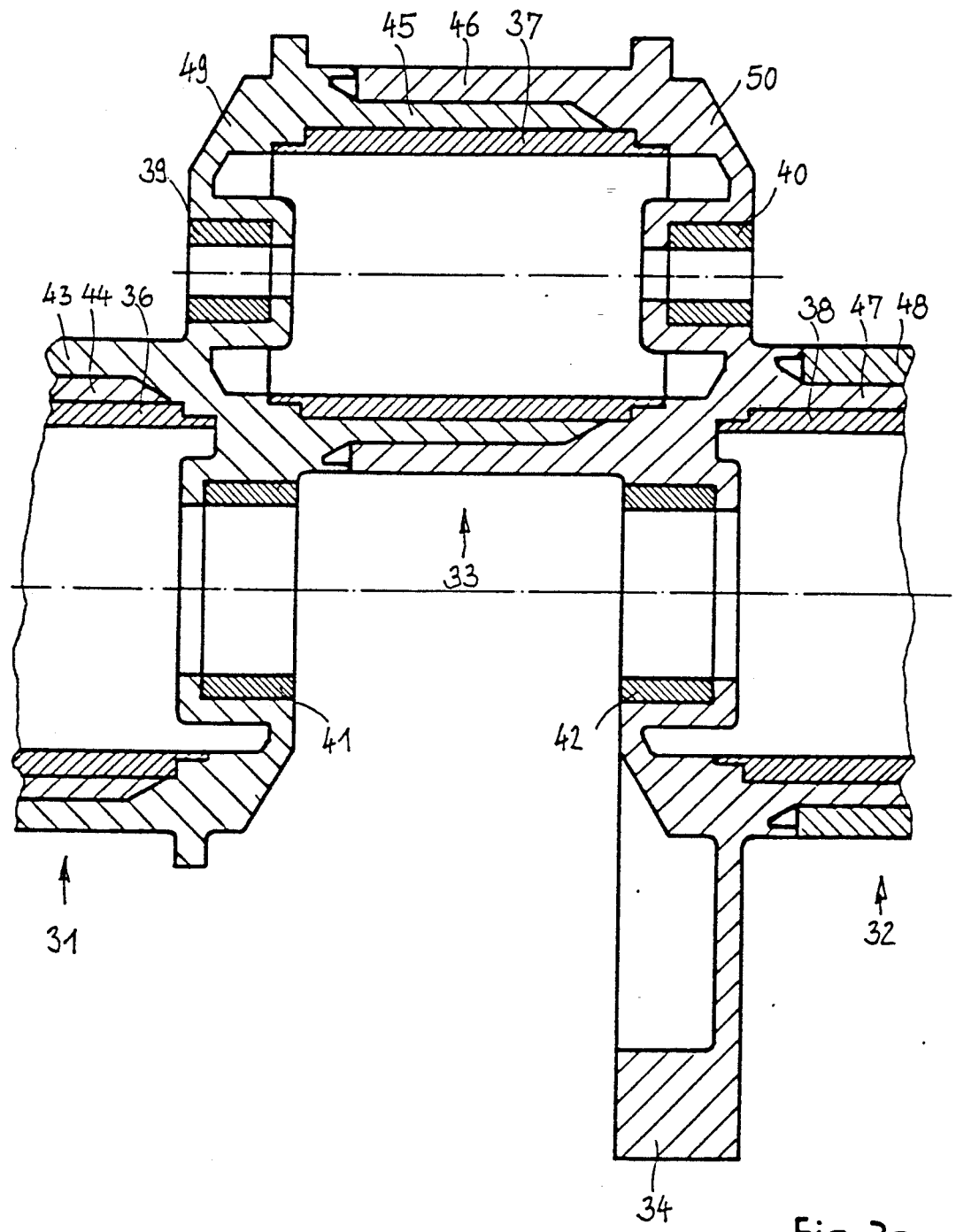
FIG. 3a is a longitudinal section through a hollow composite member in the form of a crankshaft in accordance with the invention.

FIG. 3a shows a portion of a crankshaft comprising two basic journals 31, 32 and a lifting journal 33. A counter weight 34 is arranged at the crank web. The crankshaft consists of an outer sleeve 35 and inner plastically deformed sleeves 36, 37, 38 inserted therein in the region of the journals as well as inner sleeves 39, 40, 41, 42 in the region of the crank webs. The outer sleeve 35 is composed of journal parts 43, 44; 45, 46; 47, 48 inserted into each other and alternately adjoining the crank webs 49, 50.

Figure 3C:
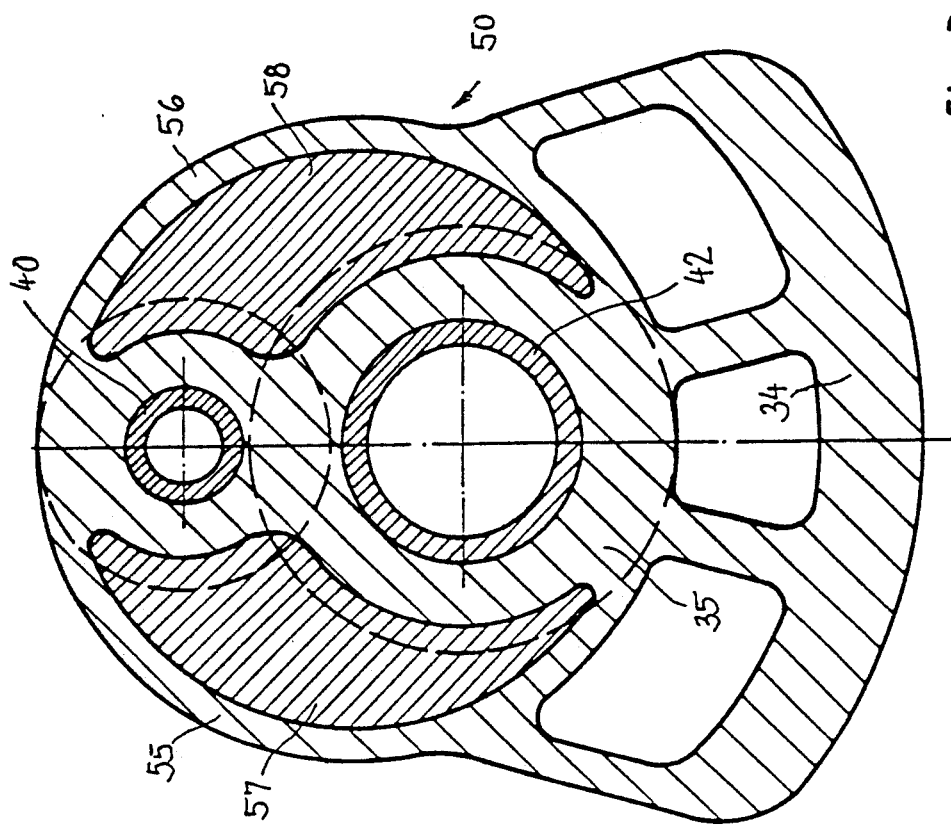
Figure 3B:
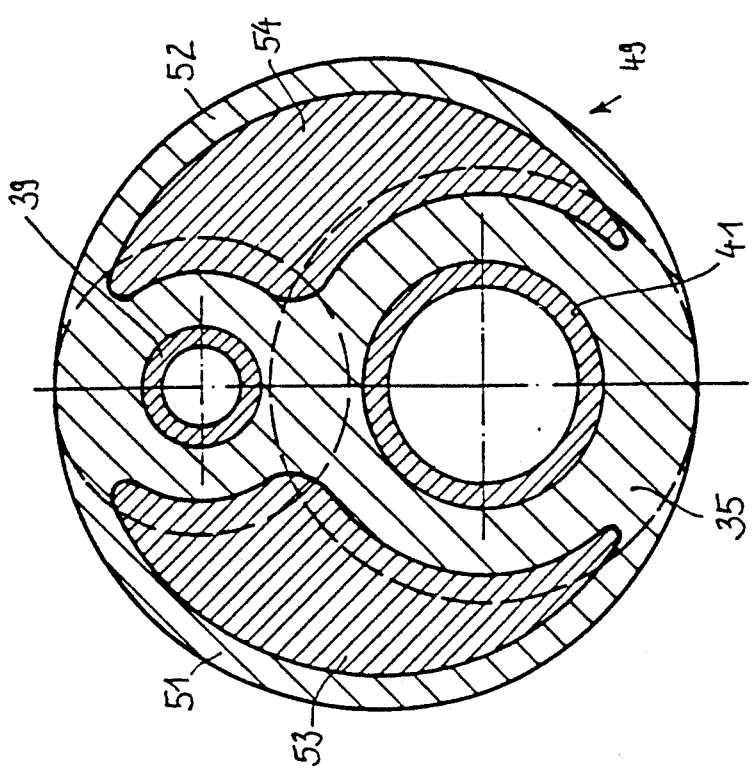

FIG. 3b shows the crank web 49 in cross-section and also illustrates the outer sleeve 35 which is approximately 8-shaped in the region of the crank web and which, via webs 51, 52, is given an annular shape. The plastically expanded sleeves 39 and 41 were inserted for the purpose of generating the tensile prestress in the 8-shaped outer sleeve 35, and approximately sickle-shaped formed members 53, 54 are inserted in order to generate and maintain the prestress in the webs 51, 52.

FIG. 3c shows a cross-section of the crank web 50 where the counter weight 34 has been attached to the approximately 8-shaped outer sleeve 35 and which, by webs 55, 56, is given an annular shape. Again, the figure shows plastically expanded sleeves 40 and 42 in cross-section as well as sickle-shaped formed members 57, 58 for generating a uniform prestress in the webs 55, 56.

In this embodiment, for the purpose of generating the prestress in the webs 51, 52, 55, 56, the formed members are inserted by being axially pressed in with a conical shape, with the conical faces extending at an angle which achieves a self-inhibiting effect.

The crank web 49 illustrated in FIG. 3d is similar to that shown in FIG. 3b. However, FIG. 3d shows multi-component clamping members 59, 60, 61; 62, 63, 64 whose cross-section is wedge-shaped and which lead to a prestress ion the webs 53, 54.

The crank web 50 illustrated in FIG. 3e is similar to that shown in FIG. 3c. Here, too, as in FIG. 3d, there are provided multi-component clamping members 65, 66, 67; 68, 69, 70 having wedge faces which move relative to each other and whose angle results in a self-inhibiting effect.

The clamping members are conical and wedge-shaped respectively in the axial direction, and their cross-section, too, is wedge-shaped, with the angles always being such that they produce a self-inhibiting effect. When the sleeves 39, 40, 41, 42 are pressed in and radially expanded, the clamping members move relative to each other and are secured against spring-back by the self-inhibiting effect at their sliding faces so that they generate and maintain a prestress in the webs 51, 52, 55, 56.

While the invention has been illustrated and described as embodied in a hollow composite member, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

1. A hollow composite member for receiving torque and/or tensile, compressive or bending forces, comprising:
   an outer layer; and
   inner supporting means accommodating pressure in a radial direction for insuring that in the outer material layer, essentially along its entire axial length, there prevails a circumferentially uniform tensile prestress, the supporting means including several annular or sleeve members (22, 23, 24) arranged so as to rest against the outer layer along parts of its circumference.

2. A hollow composite member according to claim 1, wherein the supporting means further includes intermediate formed members (25, 26, 27, 28) arranged so as to rest against the outer layer in connection with the sleeve members.

3. A hollow composite member for receiving torque and/or tensile, compressive or bending forces, comprising:
   an outer material layer; and
   inner supporting means accommodating pressure in a radial direction for insuring that in the outer material layer, essentially along its entire axial length, there prevails a circumferentially uniform tensile prestress, the supporting means including at least one annular or sleeve member (12) positioned at a distance from the outer layer (11), and clamping members (13, 14) arranged between the outer layer and the sleeve member so as to support one another.

4. A hollow composite member for receiving torque and/or tensile, compressive or bending forces, comprising:
   an outer material layer;
   inner supporting means accommodating pressure in a radial direction for insuring that in the outer material layer, essentially along its entire axial length, there prevails a circumferentially uniform tensile prestress; and
   intermediate bases provided in the supporting means and made of a material with a lower yield point than the outer layer, so as to insure additional support.

* * * * *